United States Patent
Kelsey et al.

(10) Patent No.: US 6,277,947 B1
(45) Date of Patent: Aug. 21, 2001

(54) PROCESS OF PRODUCING POLYTRIMETHYLENE TEREPHTHALATE (PTT)

(75) Inventors: Donald Ross Kelsey, Fulshear; Robert Lawrence Blackbourn, Houston; Robert Stephen Tomaskovic, Richmond, all of TX (US); Hans Reitz, Rosbach (DE); Eckhard Seidel, Frankfurt am Main (DE); Fritz Wilhelm, Karben (DE)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/556,849

(22) Filed: Apr. 21, 2000

(51) Int. Cl.$^7$ .................................................. C08G 63/78
(52) U.S. Cl. ........................ 528/279; 528/401; 528/503; 524/783
(58) Field of Search .................................. 528/279, 491, 528/503; 524/783

(56) References Cited

U.S. PATENT DOCUMENTS 4,611,049 * 9/1986 Kuratsuji et al. .................... 528/279
5,340,909 * 8/1994 Doerr et al. .......................... 528/276
5,459,229 * 10/1995 Kelsey et al. ........................ 528/275
5,798,433 * 8/1998 Schmidt et al. ..................... 528/279

FOREIGN PATENT DOCUMENTS

1046662 * 10/2000 (EP) .

* cited by examiner

Primary Examiner—Samuel A. Acquah
(74) Attorney, Agent, or Firm—Donald F. Haas

(57) ABSTRACT

Process of producing polytrimethylene terephthalate (PTT) by esterification of terephthalic acid (TPA) with trimethylene glycol (TMG) in the presence of a catalytic titanium compound, precondensation and polycondensation. The esterification is effected in at least two stages, where in the first stage a molar ratio of TMG to TPA of 1.15 to 2.5, a content of titanium of 0 to 40 ppm, a temperature of 240 to 275° C., and a pressure of 1 to 3.5 bar are used. In the at least one subsequent stage a content of titanium is adjusted which is higher than in the initial stage by 35 to 110 ppm.

19 Claims, No Drawings

PROCESS OF PRODUCING POLYTRIMETHYLENE TEREPHTHALATE (PTT)

FIELD OF THE INVENTION

This invention relates to a process of producing polytrimethylene terephthalate (PTT) with an intrinsic viscosity of at least 0.75 dl/g by esterification of terephthalic acid (TPA) with trimethylene glycol (TMG; this is also referred to as 1,3-propanediol, PDO) in the presence of a catalytic titanium compound to obtain an esterification product, precondensation of the esterification product to obtain a precondensation product, and polycondensation of the precondensation product to obtain PTT.

BACKGROUND OF THE INVENTION

Processes of producing PTT are known (U.S. Pat. Nos. 2,456,319; 4,611,049; 5,340,909; 5,459,229; 5,599,900).

For instance, U.S. Pat. No. 4,611,049 describes the use of a protonic acid as co-catalyst for accelerating the polycondensation of TMG and dimethyl terephthalate, where the addition of p-toluene sulfonic acid in a concentration of 50 mmol % effects an increase of the maximum achievable intrinsic viscosity of 0.75 dl/g in a batch process catalyzed with 50 mmol % tetrabutyl titanate to 0.90 dl/g.

U.S. Pat. No. 5,340,909 proposes to achieve an improvement of the polycondensation capacity and the color of the polytrimethylene terephthalate by using a tin catalyst, which together with titanium can already be present in the esterification. Statements on the influence of recirculation of the vapor condensates obtained during the polycondensation on the polycondensation capacity of the reaction melt cannot be found in U.S. Pat. No. 5,340,909.

U.S. Pat. No. 5,459,229 proposes to reduce the concentration of acrolein in the vapors by adding alkalines to the condensates produced during the esterification of trimethylene glycol and terephthalic acid U.S. Pat. No. 5,459,229 does not contain any details concerning the esterification and polycondensation.

U.S. Pat. No. 5,599,900 describes a process of producing polytrimethylene terephthalate, where in the presence of an inert stripping gas either after the transesterification or after the esterification a polytrimethylene terephthalate with a degree of polymerization of 64 is synthesized. Moreover, it is desired to also adjust higher molecular weights but this is not proven by experiment.

WO 97/23543A describes a process of producing polytrimethylene terephthalate, where it is provided to produce a preproduct with an intrinsic viscosity of 0.16 dl/g by means of transesterification. This preproduct is converted to pastilles by means of dripping, which pastilles directly crystallize at crystallization temperatures up to 130° C. The actual polymer is produced subsequently by solid phase condensation. It is disadvantageous that a high amount of trimethylene glycol and oligomers gets into the process gas and must be recovered or burnt, which is expensive.

U.S. Pat. No. 5,798,433 describes a process of producing PTT by direct esterification of terephthalic acid with 1,3-propanediol and subsequent precondensation and polycondensation. The PTT produced is obtained using a combination of titanium and antimony catalysts. The quantity of the required catalyst is very high and causes severe disadvantages in the product quality especially with regard to the product thermal stability.

From U.S. Pat. No. 4,011,202 the use of glycol jet pumps is known. However, the use of TMG jets is not detailed.

It can be seen that it would be advantageous to create a melt phase process of producing PTT with an intrinsic viscosity between 0.75 and 1.15 dl/g and a good thermal stability, and to achieve at the same time an efficiently long service life of the filters when the polymer melt is filtered prior to processing the same to form the end products. The process may be a batch or continuous process. Additionally, the PTT process should also allow the recycling of TMG and oligomer byproducts.

SUMMARY OF THE INVENTION

The characteristic features of this process, which comprises the catalytic esterification of TPA with TMG, precondensation of the esterification product and polycondensation of the precondensation product, are as follows:

1) The esterification is performed in at least 2 stages, one initial stage and at least one second, subsequent stage connected to a process column.

2) The catalyst used for esterification and polycondensation is a titanium compound, preferably in a stabilized liquid formulation, which is prepared from a catalytic titanium compound, an organic acid and TMG as solvent, in such way that the liquid catalyst feed contains less than 5 percent by weight (wt %) titanium 3) The catalyst used for esterification in the first, initial stage can be alternatively a Ti containing liquid reaction product from TPA and TMG with a degree of esterification of at least 97%, which may be recycled from a later reaction stage and fed to the initial esterification stage together with the raw materials.

4) A defined quantity of the described liquid catalyst feed is introduced into the first, initial esterification stage and separately a second defined quantity of the liquid catalyst feed is added to the at least one subsequent stage of esterification.

5) a major quantity between 65 and 100 wt % of said liquid catalyst feed containing 35 to 110 ppm titanium may be introduced into the at least one subsequent esterification stage, which is operated at a temperature of 245 to 260° C. and a pressure of 0.7 to 1.5 bar, 6) a minor quantity of said liquid catalyst feed containing 0 to 40 ppm titanium and up to 35% of the total catalyst may be directly fed to the initial esterification stage, which direct catalyst feed can be partially or completely substituted by the same quantity of catalyst in a reaction product, which may be recycled from any further reaction stages and which is mixed with the raw materials for further reaction in said initial esterification, 7) In the first, initial esterification stage a total molar feed ratio of TMG/TPA of 1.15 to 2.5, an amount of titanium of 0 to 40 ppm, which is in maximum 35 % by weight of the total amount of catalyst, a temperature of 240 to 275° C. and an absolute pressure of 1 to 3.5 bar are adjusted, whereby the reaction is continued until 90 to 95% of the TPA is esterified.

8) In the at least one subsequent esterification stage an additional amount of titanium of 35 to 110 ppm, which is 65 to 100% by weight of the total amount of catalyst, a temperature of 245 to 260° C. and an absolute pressure of 0.7 to 1.5 bar are adjusted, whereby the reaction is continued until 97 to 99% of the TPA is esterified.

9) The precondensation is performed at a temperature of 245 to 260° C. under a reduced pressure in the range from 2 to 200 mbar.

10) The polycondensation is carried out in the melt phase at a temperature increasing from the entry to the exit of the polycondensation reactor from 250 to 270° C. and at an absolute pressure of 0.2 to 2.5 mbar.

11) For generating the vacuum of the precondensation and polycondensation vapor-jet pumps are used, which are operated with TMG vapor, and the vapors sucked off and said TMG vapors are compressed by the vapor jet pumps and condensed by spraying them with a liquid which predominantly consists of TMG, for example the condensate from these spray condensers and optionally fresh make-up TMG.

DETAILED DESCRIPTION OF THE INVENTION

The feed amount of titanium in the first, initial esterification stage preferably is in the range from 5 to 25 ppm. As the catalytic titanium compound to prepare the catalyst liquid there may preferably be used titanium tetrabutylate or titanium tetraisopropylate. As advantageous catalytic titanium compounds there may for instance also be used any catalytic titanium compound, such as titanium alkylates and their derivatives, like tetra-(2-ethylhexyl)-titanate, tetrastearyl titanate, diisopropoxy-bis(acetyl-acetonato)-titanium, di-n-butoxy-bis (triethanolaminato)-titanium, tributyl monoacetyltitanate, triisopropyl monoacetyltitanate or tetrabenzoic acid titanate, titanium complex salts, like alkali titanium oxalates and malonates, potassium hexafluorotitanate, or titanium complexes with hydroxycarboxylic acids such as tartaric acid, citric acid or lactic acid. Also special catalysts as titanium dioxide—silicon dioxide—co-precipitate or hydrated alkaline containing titanium dioxide can be used. Equivalent zirconium catalysts could also be used.

The solvent which is used in the liquid catalyst feed is TMG, in which for stabilization reasons a $C_4$ to $C_{12}$ dicarboxylic acid is dissolved in quantities below its saturation concentration at ambient temperature.

The organic di-acid which is preferably used for the liquid catalyst feed is selected from terephthalic acid, isophthalic acid or another $C_4$–$C_{12}$ aromatic or aliphatic dicarboxylic acid. Preferably the $C_4$ to $C_{12}$ dicarboxylic acid is incorporated in the PTT and does not act as chain stopper. A further embodiment consists of solutions of catalyst in TMG in which a $C_2$ to $C_{12}$, preferably $C_2$ to $C_8$, monocarboxylic acid is dissolved below its saturation concentration. The preferred monocarboxylic acid is acetic acid.

As further embodiment of the invention the catalyst liquid can be a Ti containing liquid reaction product from TPA and TMG with a degree of esterificaiion of at least 97%. This product is recycled from a later reactor stage and mixed to the first, initial esterification process together with the raw materials. In the continuous process the recycled product amounts to 5 to 40 wt %, more preferably to 10 to 30 wt % of the nominal throughput. In the case of the batch process the amount of recycled product lies between 25 and 85 wt %, preferably between 35 and 70 wt % of the nominal batch size. This option of the invention includes reaction products which may be withdrawn at any point between the exit from the second stage of esterificaiion and the entry into polycondensation, and which are used as liquid catalyst feed for the first initial esterification stage.

The second portion of the catalyst may be fed after the esterification step. An important aspect of the invention consists in that in the initial stage of esterification a specific combination of parameters is used.

The described special catalyst liquid is well proven at temperatures within the range of 250 to 270° C., an elevated molar feed ratio of TMG to TPA between 1.15 and 2.5, preferably between 1.5 and 2.4, and a pressure of 1 to 3.5 bar. Under these conditions only a minor formation of non-filterable particles occurs independently whether delustering agents, like $TiO_2$, or other additives are used. This is particularly necessary in the production of fibers.

In accordance with a further preferred aspect of the invention, the first initial stage of esterification is conducted to a TPA conversion of 90 to 95%, and the second stage of esterification raises the TPA conversion to 97 up to 99%. Late in the second stage of esterification it has been assured that the last particles of solid TPA from the paste are completely dissolved and the melt is clear and bright.

The catalyst liquid introduced into the second or further stages of esterification is preferably a clear solution. These above mentioned conditions enable low filter values of the PTT.

The process can be a continuous or a batch process. In the discontinuous process the initial process cycle with a transiently heterogeneous reaction mixture and a limited TPA conversion of below 95%. is considered as the first, initial stage of esterification, while the later reaction cycle in a homogeneous melt phase at a TPA conversion of at least 97% represents the at least one subsequent esterification stage. Accordingly the second part of the liquid catalyst feed is added when the TPA has been esterified to at least 95%, preferably to more than 97%.

The precondensation, especially in the continuous process, is preferably divided into two pressure sections to provide an optimum condensation process. The first stage of precondensation is performed between 50 and 200 mbar, the second stage between 2 and 10 mbar.

It is particularly advantageous when the polycondensation of the prepolymer melt is performed at a pressure of 0.3 to 0.8 mbar.

Preferably the polycondensation reactor is a disc ring reactor or a cage type reactor, which allows the formation of steadily renewed, large film surfaces of the reaction product and facilitates by this the evaporation of the volatile products. Under these conditions, increased intrinsic viscosities in the range from 0.75 to 1.15 dl/g are possible.

In keeping with the desire to maintain control of the temperature to which the oligomer or polymer is exposed during each stage of the process including polycondensation, the temperatures of the walls of the reaction vessels are controlled, as contact of the polymer with excessively hot vessel walls is a potential cause of polymer degradation. It is preferred that a heat transfer medium (HMT) be used to control the temperature of the reactor walls and that the HMT temperature be not more than 300° C., preferably not more than 290° C.

It is surprisingly found out that in accordance with the inventive process very advantageous filter values of 0 to 40 bar-cm$^2$/kg can be realized (for the determination of filter value, see below).

In accordance with a further object of the invention it is provided that the condensates of the spray condensers, optionally after the distillation of low boilers, are recirculated into the first initial and possibly further stages of esterification. In this way, a substantial reduction of the losses in raw materials is achieved.

In accordance with a further preferred embodiment of the invention it is provided that the PTT contains up to 20 wt % comonomer units derived from other dicarboxylic acids and/or diols. As other dicarboxylic acid there may for instance be used adipic acid, isophthalic acid or naphthalene dicarboxylic acid. As diols there may for instance be used ethylene glycol, diethylene glycol, triethylene glycol, butylene glycol, polyglycols, as well as cyclohexane dimethanol. In this way, the end product can be adapted to the respective application relatively easily.

A further embodiment of the invention consists in that at any point before the end of the polycondensation in the melt phase usual additives such as delustering agents and/or color agents and/or branching agents and/or stabilizers can be added. By means of this measure, the number of the applications of the end product will be increased in connection with a particular viscosity adjustment.

In accordance with the invention, a polyester-soluble cobalt compound, for instance cobalt acetate, and/or polyester soluble organic dyes can be used as color agent or blue toner. As stabilizer a phosphorus compound is added with up to 20 ppm phosphorus, based on PTT, in connection with the cobalt compound and up to 10 ppm phosphorus without any addition of cobalt. By this amounts of phosphorus the catalysis of the thermal degradation of the PTT melt by ions of heavy metals including of the cobalt is stopped because of the formation of neutral phosphorus salts. In special cases the addition of phosphorus may be omitted completely; this depends on the quality of the raw materials, the construction materials of the equipment as well as on the final product application.

Other stabilizers include hindered phenolic esters such as those selected from the group consisting of methyl(3-(3,5-di-t-butyl-4-hydroxyphenyl)propionate, octadecyl 3-(3,5-di-t-butyl-4-hydroxyphenyl)propionate, tetrakis(methylene-3,5-di-t-butyl-4-hydroxyphenyl) propionate))methane, 1,6-hexamethylene bis(3-(3,5-di-t-butyl-4-hydroxyphenyl) ropionate), triethyleneglycol bis(3-(3-t-butyl-4-hydroxy-5-methylphenyl)propionate) and 1,3,5-tris(3,5-di-t-butyl-4-hydroxybenzyl)-1,3,5-triazine-2,4,6(1H,3H,5H)-trione.

Also, there may be used as stabilizers aromatic organophosphites including those selected from the group consisting of tris(2,4-di-t-butylphenyl)phosphite, bis(2,4-di-t-butylphenyl)pentaerythritol diphosphite and 2-[[2,4,8,10-tetrakis(1,1-dimethylethyl)dibenzo [d,f][1,3,2]-dioxaphosphepin-6-yl]oxy]-N,N-bis[2-[[2,4,8,10-tetrakis(1,1-dimethylethyl)dibenzo[d,f][1,3,2] dioxaphosphepin-6-yl]oxy]-ethyl]ethanamine.

A further optional aspect of the invention is that carboxylic acids with three or more COOH groups, polyfunctional acid anhydrides, or polyfunctional alcohols with three or more OH groups, or carboxyphosphonic acids or the esters thereof in concentrations below 5000 ppm can be incorporated into the polymer as branching agents. For polycarboxylic acids and polyalcohols concentrations below 1000 ppm are sufficient in most cases. These compounds can particularly be used for adjusting or raising the intrinsic viscosity.

The PTT can be directly processed to fibers, films or other molded materials. In accordance with a further embodiment of the invention is provided that after the polycondensation in the melt phase the PTT is granulated and crystallized. The resulting granulate can also be thermally treated in the solid state for further IV build up or for devolatilizing low molecular organic products such as acrolein, allyl alcohol, and water. The PTT granulate can then be processed to fibers, filaments, films or molded articles.

The processed products, i.e. fibers, filaments, films, molded articles or chips, are characterized by an IV of 0.8 to 1.1 dl/g, a filterability of <40 bar-cm$^2$/kg and a thermal stability (as defined below) of >80

EXAMPLES

In examples 1–8, the intrinsic viscosities (IV) were determined with a solution of 0.5 g polyester in 100 ml of a mixture of phenol and 1.2-dichlorobenzene (DCB) (3:2 parts by weight) at 25° C. In examples 9–18, tetrachloroethane (TCE) was used with phenol as described below. These tests give virtually the same IV results and are related as follows: IV(DCB)=0.963 IV(TCE)+0.036. The COOH terminal group concentration is determined by photometric titration with 0.05 N ethanolic potassium hydroxide solution against bromothymol blue of a solution of polyester in a mixture of o-cresol and chloroform (70:30 parts by weight). The measurement of the polymer color values is made on crystallized polyester granules (crystallization at 150±5° C./1 h) in a tristimulus calorimeter containing three photoelectric cells with a red, green, or blue filter. The color values were calculated from the parameters X, and Z according to CIELAB.

The filtration behavior of the product melts is determined as follows: PTT dried for 13 hours at 130° C. and a reduced pressure of <1 mbar is melted in a laboratory extruder and metered through a disc filter with a mesh size of 15 μm and a filter area of 2.83 cm$^2$ by means of a gear pump at a temperature of 260° C. The increase in pressure before the filter is recorded in relation to the amount of melt conveyed and the filterability is calculated as filter value (FV):
FV=filter pressure [bar]–filter area [cm$^2$]/amount of melt [kg]

The thermal stability (TS) of the PTT melt is determined by measuring the intrinsic viscosity of the PTT chips dried for 13 hours at 130° C. and a reduced pressure of <1 mbar as $IV_O$ before and as $IV_T$ after tempering of the dried chips over one hour at a reference temperature of 255° C. in a closed tube under nitrogen.

TS [%]=100–$IV_T$/$IV_O$

The stated concentrations of the catalysts and additives used in the following examples are defined as parts per million (ppm) referring to the TPA feed.

The catalyst solutions used in the examples according to the invention were prepared as follows:
Catalyst Preparation A:
  (TPA-Stabilized TMG Solution)
Because of the hygroscopic properties of TMG, the catalyst solutions were preferably prepared and stored under nitrogen atmosphere. TMG is preheated to 80° C. 50 mg TPA per kg TMG were added while stirring, and stirring is continued until a clear solution is obtained after 20 minutes. The TMG/TPA solution is cooled to about 30° C.

The titanium tetrabutylate is metered with a dropping funnel to the cold, clear acidified TMG solution while stirring. There is thus produced a solution of 2 wt %. titanium tetrabutylate in acidified TMG, which is used in this form. When the first drops of titanium tetrabutylate were added, the TMG solution turned light yellow.

Remarkably, this color did not change anymore during the further addition of titanium tetrabutylate.
Catalyst Preparation B:
  (IPA-Stabilized TMG Solution)
The TMG is preheated to about 60° C. Then a clear solution of 500 mg isophthalic acid (IPA) per kg TMG is produced by stirring. This concentrated solution is cooled to about 30° C. Before adding the titanium tetrabutylate the cooled solution is diluted with fresh TMG in a ratio of 1:4. Thus, the concentration of IPA in the finished solution is 100 mg IPA per kg TMG. The addition of the titanium tetrabutylate to the TMG/IPA solution is performed in the same way as for preparation A.

Preparation of Catalyst C

Titanium tetrabutoxide (100 parts) was added slowly with stirring to about 35 to about 100 parts glacial acetic acid under nitrogen atmosphere. 1,3-Propanediol was then added gradually to this solution to adjust the concentration of titanium to about 1 wt % (7% titanium tetrabutoxide). The catalyst solution was clear, water-white and stable for several days at ambient temperatures with no evidence of precipitates.

The invention is illustrated in the following examples. The results of the examples are summarized together with the fed concentrations of catalyst and additives in the table. Examples 1, 2, and 4 are comparative examples.

Examples 1 to 3 (Batch Process)

In this batchwise production of PTT a part of prepolymer from a preceding, prepolymer batch in a quantity of about 42 wt % of the nominal batch size is kept back in the esterification reactor for the next reaction cycle for stirring the esterification product and for feeding and heating the raw materials TMG and TPA as a paste including the esterification catalyst and optionally cobalt acetate as color agent. The molar TMG to TPA feed ratio of the paste is listed in the table.

The quantity of TPA fed into the esterification reactor is 180 kg. The feeding time is 130 minutes. The total cycle time of esterification in examples 1 and 2 is 160 minutes at a temperature of 265° C. and a pressure of 1000 mbar (abs.). A column disposed subsequent to the esterification reactor is used for separating the low-boiling compounds, mainly process water, from the trimethylene glycol in the vapors from the esterification, and for the recirculation of the distilled TMG to the process all the time of esterification. The precondensation is carried out in 30 minutes at a simultaneous pressure reduction to 50 mbar (abs.). Thereafter, the prepolymer melt is transferred to a disc ring reactor, and the polycondensation is started by agitating defined by a standard program of speed control and further reducing the pressure within 45 minutes to 0.5 mbar as final pressure. The polycondensation temperature in examples 1 and 2 increased from 260 to 268° C. The total duration of polycondensation indicated in the table corresponded to the maximum viscosity of the polymer possible under the selected conditions, i.e., if the polycondensation is further continued, the intrinsic viscosity of the polymer decreased again due to the predominance of the thermal degradation reactions. Upon reaching the viscosity maximum, the polycondensation is stopped. At an applied pressure of 55 to 60 bar the polymer melt is discharged from the reactor and granulated.

Special Feed Conditions Within Example 1 (Comparative)

In example 1, titanium dioxide/silicon dioxide co-precipitate containing 80 mole % $TiO_2$ with 50 ppm Ti is fed to the paste as esterification catalyst. In addition, cobalt acetate with 40 ppm Co is added to the paste. Before starting of the precondensation, phosphoric acid with 40 ppm P is added to the melt and after further 2 minutes antimony triacetate with 250 ppm Sb is added as polycondensation catalyst.

Special Feed Conditions Within Example 2 (Comparative)

In example 2, titanium tetrabutylate with 75 ppm Ti is fed to the paste as esterification catalyst. Before start of the precondensation reaction in the esterification reactor, antimony triacetate with 200 ppm Sb is added as polycondensation catalyst.

Selected process conditions and quality values of the polytrimethylene terephthalate obtained are listed in the following table. In the comparative process very high amounts of catalyst up to 300 ppm were required. In the following inventive examples 80 ppm Ti were sufficient at comparable process times. The process results of the Comparative examples show a deficit with regard to the possible IV build-up, the thermostability, and the filterability.

Special Conditions Within Example 3 (Inventive)

According to example 3, TMG and commercially available TPA in a molar ratio of 1.3 were continuously fed into a paste mixer. Additionally 15 ppm titanium were added via a catalyst liquid of titanium tetrabutylate in TMG containing TPA according to catalyst preparation A. The resulting paste is fed into the esterification reactor over 130 minutes and reacted batchwise (similar to example 1 and 2). The reaction is performed at an increased pressure of 2000 mbar and at a temperature of 255° C. during a cycle time of 160 minutes. The column of the esterification is operated at a molar recycling ratio of TMG to TPA of 0.1 to 0.9, which ratio passed through a maximum during the esterification time. The average total molar feed ratio of TMG to TPA in the esterification reactor is about 1.8.

For completion of the esterification, the reactor pressure is reduced to 1000 mbar within 15 minutes and the esterification is continued in the later stage while stirring at 1000 mbar for 30 minutes. At 5 minutes before starting the vacuum program 65 ppm titanium are added to the esterification product as polycondensation catalyst via the catalyst liquid of preparation A at steady stirring of the product mixture. The subsequent precondensation is carried out during 30 minutes at a temperature of 255° C. and a simultaneous reduction of the pressure to 100 mbar. Subsequently, the melt is transferred to a disc ring reactor, where it is polycondensated at an increasing temperature of 251–262° C. at a dwell time of 165 minutes and a final pressure of 0.5 mbar. Thereafter the melt is discharged and granulated to PTT chips.

This example clearly illustrates according to the table that under batch conditions, when using the conditions described in the present invention, a stable PTT with an IV of 1.1 dl/g and a filter value of 27 bar-cm$^2$/kg is produced. The relatively low concentration of carboxyl endgroups in the PTT indicates that no remarkable polymer degradation during discharge of the PTT occurrs. The thermal stability of the PTT enables a problem-free extrusion and spinning or molding to obtain high quality PTT products.

Examples 4 to 8 (Continuous Process)

Example 4 (Comparative)

TMG and commercially available TPA in a molar ratio of 1.16 is continuously fed to a paste mixer, and a paste is produced. The catalyst concentration in the paste is 15 ppm titanium. As catalyst titanium tetrabutylate is used as a 10 wt % mixture with TMG. The paste is continuously fed into the initial esterification reactor and reacted at a pressure of 1000 mbar and a temperature of 255° C. for a mean dwell time of 172 minutes under stirring and steady TMG reflux from the esterification column. Into the transfer line to a subsequent stirred esterification stage, a second portion of the catalyst (10 wt % titanium tetrabutylate in TMG) with 65 ppm Ti is added, and the product is further esterified in the subsequent esterification stage at a pressure of 1000 mbar, a temperature of 255° C. with a mean dwell time of 60 minutes. The esterification product is transferred into a third reaction stage also equipped with a stirrer for precondensation at 100 mbar and 255° C. within 30 minutes.

Likewise the precondensation is completed in a further stage at 7 mbar, 257° C. within 35 minutes. The precondensate, showing an IV of 0.26 dl/g is transferred to a disc ring reactor by means of a gear-type metering pump for the final polycondensation at a vacuum of 0.5 mbar, a mean dwell time of 150 minutes, an increasing temperature profile of 258–264° C., and an agitator speed of 5.5 rpm. From the disc ring reactor, the melt is discharged and granulated.

The PTT thus produced has an intrinsic viscosity of 0.92 dl/g and a filter value of 143 bar-cm$^2$/kg. The higher concentration of carboxyl endgroups in the PTT indicated another different (from the invention) polymer formation, whereas the thermal properties of the products are similar. Polymers with such high filter values entail to a short service life of the filter in the spinning process, and are not suitable for the production of fibers and filaments.

Example 5

In example 5, the conditions for the production of PTT corresponds to example 4 with following exceptions. The molar ratio TMG:TPA in the paste is raised to 1.3 and the catalyst concentration in the paste is 15 ppm titanium. As catalyst liquid, catalyst preparation B is used. The paste is continuously fed into the first initial esterification reactor and reacted while stirring at a pressure of 2000 mbar and a temperature of 255° C. for a mean dwell time of 172 minutes. The molar reflux from the column of the esterification amounted to 0.8 moles TMG per TPA. Thus, a total molar ratio of TMG to TPA of 2.1 is present. After the continuous transfer to a second subsequent esterification stage, a further amount of catalyst of 65 ppm Ti is added into the mixed esterification product in form of the catalyst preparation B. The esterification in the second stage, the precondensation, and the polycondensation are performed at conditions identical to those in example 4.

The PTT thus produced had an intrinsic viscosity of 0.93 dl/g and a filter value of 5 bar-cm$^2$/kg. The good filter value of the intermediate prepolymer sample of 8 bar-cm$^2$/kg, indicates a good filterability of the melt. In the PTT production process and in the production of fibers and filaments this offers great economic advantages due to a long service life of the filter.

Example 6

Similar to example 5, TMG and TPA are continuously fed into the paste mixer in a molar ratio of 1.25. Thereby 70 wt % of the TMG used consisted of recycled TMG collected from the vapor condensers of different stages. The concentration of solids (a mixture of PTT oligomers) in the recycled TMG is 2.5 wt %. In addition, 15 ppm titanium as catalyst solution, preparation B, and 20 ppm Co as cobalt acetate are added to the raw material paste, and the paste is pumped to the initial esterification stage. The total molar TMG to TPA feed ratio including the TMG reflux from the column is 1.9. All other process conditions in esterification, precondensation, and polycondensation are selected in accordance with example 4. According to example 5, additional 65 ppm Ti are added into the mixed esterification product of the subsequent second esterification stage. As catalyst liquid feed is used preparation B. Additionally 20 ppm P (as solution of phosphoric acid in TMG) are dosed into the transfer line of the esterification product to the first precondensation stage. The granulated PTT had a viscosity of 0.918 dl/g and a filter value of 7 bar-cm$^2$/kg.

Example 7

Example 7 is performed in a similar way as example 6, and for the production of paste there is likewise used recycled TMG. The molar ratio TMG to TPA is 1.25. 46 wt % of the TMG present in the feed paste are recycled TMG with a content of oligomeric solids of 2.2 wt %. Different from example 6, 10 ppm Co as cobalt acetate and 5 ppm P as phosphoric acid are added to the paste. The catalyst feed into the paste is 15 ppm Ti as catalyst liquid preparation A. The polycondensation catalyst is added in an amount of 65 ppm Ti, as catalyst liquid preparation A to the melt of the subsequent second esterification stage. The other process conditions are as following:

Total TMG/TPA - mol ratio = 1.0
| | | | |
|---|---|---|---|
| 1st Esterification stage: | 249° C. | 2000 mbar | 230 min |
| 2nd Esterification stage: | 248° C. | 1000 mbar | 30 min |
| 1st Prepolycond. stage: | 247° C. | 80 mbar | 37 min |
| 2nd Prepolycond. stage: | 247° C. | 8 mbar | 41 min |
| Polycondensation stage: | 247–260° C. | 0.3 mbar | 220 min |

Under these process conditions a PTT is obtained with an IV of 0.93 dl/g, a high thermal stability, and a good filterability.

Example 8

(Continuous Process with Recirculation of the Melt from Esterification 2 to Esterification 1)

TMG and TPA are continuously fed into the paste mixer in a molar ratio of 1.25. Thereby, 58 wt % of the TMG used consists of recycled TMG with 2 wt % of oligomeric solids. After achieving stationary flow conditions the TMG/TPA feed paste without any catalyst is transferred to the first, initial stirred esterification stage. At the same time a separate partial recycling stream of 19 wt % of the product from the subsequent second esterification stage is directed to the first initial stage containing the catalyst as a diluted solution in a prereacted homogenous product mixture with an increased degree of esterification of about 97.5%.

The actual catalyst addition to the second esterification stage is carried out with 80 ppm Ti (based on PTT) as liquid catalyst preparation B. As a consequence of the partial product recycling from the second subsequent esterification stage into the initial esterification stage the relative throughput per 100 wt %. product is in both esterification stages increased to 119 wt % and the average residence times are decreased to 135 and 48 minutes. The total molar TMG to TPA feed ratio to the esterification is 2.0. Further conditions are:

| | | |
|---|---|---|
| 1st esterification stage: | 255° C. | 1800 mbar |
| 2nd esterification stage: | 255° C. | 1000 mbar |

The process conditions in the precondensation and polycondensation are the same as in example 4. The final PTT product shows an IV of 0.913 dl/g, a good thermal stability, and a good filterability, in accordance with the invention.

TABLE A

Selected feed parameters, process parameters, and product properties of the examples 1–8

| Run | TMG in paste (mol) per 1 mol TPA | Esterification Catalyst Type | Ti (ppm) | Color agent Co (ppm) | H₃PO₄ P (ppm) | Prepolymer Filler value bar cm²/kg | Polycondensation Catalyst Type | Sb (ppm) | Ti (ppm) | Duration of Polycondensation (min) | Polytrimethylene terephthalate I.V. (Dl/g) | TS (%) | COOH meq/kg | Filter value bar cm²/kg |
|---|---|---|---|---|---|---|---|---|---|---|---|---|---|---|
| 1 (comp) | 1.25 | TiO₂:SiO₂ | 50 | 40 | 40 | 52 | SbAc₃ | 250 | — | 171 | 0.916 | 72.1 | 14 | 68 |
| 2 (comp) | 1.3 | Ti (OBu)₄ | 75 | — | — | 45 | SbAc₃ | 200 | — | 80 | 0.892 | 71.6 | 12 | 42 |
| 3 (inv) | 1.3 | Ti (OBu)₄ | 15 | — | — | 4 | Ti (OBu)₄ | — | 65 | 165 | 1.101 | 80.2 | 10 | 27 |
| 4 (comp) | 1.16 | Ti (OBu)₄ | 15 | — | — | 189 | Ti (OBu)₄ | — | 65 | 150 | 0.922 | 82.9 | 19 | 143 |
| 5 (inv) | 1.3 | Ti (OBu)₄ | 15 | — | — | 8 | Ti (OBu)₄ | — | 65 | 150 | 0.930 | 83.7 | 10 | 5 |
| 6 (inv) | 1.25 | Ti (OBu)₄ | 15 | 20 | 20 | 2 | Ti (OBu)₄ | — | 65 | 150 | 0.932 | 83.6 | 11 | 7 |
| 7 (inv) | 1.25 | Ti (OBu)₄ | 15 | 10 | 5 | 31 | Ti (OBu)₄ | — | 65 | 220 | 0.921 | 84.0 | 12 | 29 |
| 8 (inv) | 1.25 | Ti (OBu)₄ | 15* | — | — | 22 | Ti (OBu)₄ | — | 80 | 150 | 0.913 | 84.2 | 11 | 18 |

*Catalyst feed by partial product recycling from the second esterification stage
(comp): Comparative example
(inv): Example according to the invention
I.V.: Intrinsic Viscosity of PTT, determined with 0.5 g sample in 100 mL of 3:2 (wt.) phenol:1,2-dichlorobenzene at 25° C.
TS: Thermal stability of PTT (255° C./N₂/1h)
COOH: Carboxyl terminal groups of PTT, determined by photometric titration with 0.05 n ethanolic potassium hydroxide solution against bromothymol blue of a solution of polyester in 70:30 (wt) 0-cresol:chloroform.
TiO₂:SiO₂: Titanium dioxide-silicon dioxide-co-precipitate with 80 mol % TiO₂, supplier; Akzo (DE)
Ti (OBu)₄: Titanium tetrabutylate
SbAc₃: Antimony triacetate
Color agent Co: Cobalt-II-acetate

Example 9
Effect of Excessive Wall Heat on Allyl Endgroup Content of Polytrimethylene Terephthalate (Comparative)

The reactor used for these runs was electrically heated by several heating rods imbedded in the reactor wall. The stirrer was a helical ribbon with close tolerance (~1 mm) to the side walls, which provides efficient mixing. A temperature-controlled column allowed distillation of water and PDO. The reactor can be run under pressure and high vacuum. Because of the electrical heating, the wall temperatures were as high as 320° C. in the first trial. For the second trial, the wall temperatures were lowered to 285° C.

For the first trial, three esterification products were made as follows. The reactor was charged with 2417 gm TPA and 387 gm PDO and heated to an internal temperature of 240° C. (wall temperature to 320° C.) over a period of 1.5 hours. A total of an additional 996 gm PDO was added in three portions over 4 hours at an internal temperature between about 256–266° C. and wall temperatures of 291–317° C. and under nitrogen pressure up to about 1 bar (column temperature 103–139° C.). After a total of about 7 hours from initial heatup, about half of the oligomer was discharged and the reactor cooled (water jacket). The following day, 1200 gm TPA was charged to the oligomer in the reactor and a total of 687 gm PDO was added in three portions over about 2.5 hrs. Heat-up to 228° C. (wall temperature 320° C.) took about 1.5 hrs, and the reaction temperature was about 266° C. (wall temperature 294–305° C.). Total reaction time was about 4 hours. A third esterification similar to the second was run the next day.

The resulting oligomer was polymerized as follows. Titanium butoxide catalyst (1.3 gm, 80 ppm Ti) was charged to the cold oligomer and the reactor was heated to 237° C. internal temperature (wall temperature up to 320° C.) over about 1.5 hrs. Vacuum was applied over the next 30 minutes to reach 1.2 mbar, and the reaction mixture was heated at 260–266° C. (wall temperature 286–308° C., typically about 293–299° C.) for the next 5.7 hrs. under 0.3–1.0 mbar. Over the first 4 hrs. under full vacuum, the power on the stirrer increased from about 1.23 to about 1.30 and then decreased to about 1.25 during the last hour. The polymeric product was discharged from the reactor through a die into a water bath but did not form a strand.

In the second trial, esterification was conducted similarly to the first trial except that reactor wall temperature was limited to 285° C. The initial heatup to 240° C. (wall 280° C.) took about 2.3 hrs. and the reaction temperature was about 244–256° C. (wall 285° C.) for the next 5.3 hrs. and then about 266° C. for an additional 2 hrs. The total reaction time from initial heatup was about 9.7 hrs. The next day the second esterification was conducted similarly at a reaction temperature of about 258–267° C. (wall 281–285° C.). A third esterification was not run for the second trial.

The polymerization was conducted similarly to that of the first trial, except that the amount of oligomer was about 25% more (to increase stirrer load), catalyst level was increased from 80 to 100 ppm (as Ti), and the wall temperature was again limited to 285° C. The reaction was heated to about 256° C. (wall 285° C.) over about 2.7 hrs at which time the vacuum was 1.3 mbar. The reaction was continued at about 285–266° C. (wall 285° C.) at between 0.2 and 1.2 mbar for an additional 4.2 hrs.

During this time the stirrer power (amps) increased from about 1.25 to about 1.37 and declined to 1.33 during the last hour. This time the product from the reactor was stranded and pelletized. During the discharge, the reactor temperature was lowered to about 240° C.

The control polymer is typical PTT prepared similarly to the procedure of Example 10 below in an oil-heated reactor at oil temperatures of about 270° C. or below and reaction temperatures of about 245–265° C. Compared to the control, the polymers made using relatively high wall temperatures had lower molecular weight (IV), very high carboxylic acid endgroups and very high allyl endgroups (see Table B below).

The allyl endgroups are the result of thermal degradation of the polymer. The relatively high levels of ally endgroups in the polymers prepared in the electrically-heated reactor show that extensive degradation occurred even though the bulk of the polymer was generally at about 266° C. or below. Less degradation occurred when the wall temperature was reduced to 285° C., but was still extensive.

TABLE B

|  | Allyl mole % | COOH equiv./ton | IV |
|---|---|---|---|
| First trial |  |  |  |
| Oligomer #1 | 0.6 | 363 |  |
| #2 | 0.7 | 250 |  |
| #3 | 0.6 | 243 |  |
| Polymer | 3.7 | 374 | 0.24 |
| Second trial |  |  |  |
| Oligomer #1 | 1.0 | 386 |  |
| #2 | 0.9 | 298 |  |
| Polymer | 1.7 | 55 | 0.58–0.63 |
| Control Polymer | 0.6–0.8 | 10–20 | 0.65–0.68 |

Example 10
Melt Polymerization of High-I.V. Polytrimethylene Terephthalate. (Comparative)

An oil-heated stainless steel reactor was charged with about 11.5 lbs 1,3-propanediol and about 19.3 lbs terephthalic acid, and heated to about 260–265° C. by means of a hot oil jacket temperature of about 269° C. under 10–60 psig nitrogen. The aqueous distillate was removed over about 4 hours. To the oligomeric product was added about 9.6 lbs 1,3-propanediol and about 16.1 lbs terephthalic acid. The reaction was continued under similar conditions for typically less than 3 hours to form a higher molecular weight oligomer.

About half of this product was transferred to a second reactor which has a dual spiral impeller arrangement. For subsequent batches, 1,3-propanediol (9.6 lbs) and terephthalic acid (16.1 lbs) were added to the oligomer remaining in the first reactor and the oligomerization under pressure was repeated. Titanium tetrabutoxide catalyst (100 ppm Ti based on final polymer) was added as a solution in PDO/HOAc (catalyst preparation C) to the second reactor, the reaction mixture was heated at 234° C. at an oil jacket temperature of about 250° C., the pressure was reduced to 0.2 mm Hg over about an hour to remove the excess 1,3-propanediol. After about 2 hours at full vacuum and 246° C. (260° C. oil temperature), the molten polymer was discharged from the reactor as strands, cooled and pelletized (typically 17–19 lbs product). The melting point of the polymer was 227.8° C., the carboxyl content was 17 eq/ton and the intrinsic viscosity was 0.89.

Four additional batches prepared under similar conditions produced polymers with maximum I.V.'s of about 0.86–0.87.

A similar preparation using 60 ppm Ti and temperatures of 263° C. (oil 269° C.) for esterification, 242° C. (oil 254° C.) for vacuum pulldown and 252° C. (oil 265° C.) for polycondensation for 1.5 hrs gave polymer maximum I.V. of 0.81.

Similar preparations with 40 ppm Ti under similar conditions (with smaller charge to improve stirring) gave polymers with maximum I.V.'s of 0.83, 0.86 and 0.87. Increasing the catalyst to 80 ppm gave maximum I.V.'s of 0.93 and 0.87 after about 1 hour of polycondensation.

Example 11
Preparation of Polytrimethylene Terephthalate in the Melt using a Disk Ring Autoclave In the course of several batch polymerizations, a paste consisting of about 99 kg PDO, 180 kg TPA, 14.4 g hindered phenol stabilizer (80 ppm based on final polymer), 64.6 g neat (thus, dilute liquid catalyst is not absolutely required) titanium tetrabutoxide catalyst (50 ppm based on TPA), and 20 ppm Co (based on TPA) as cobalt acetate bluing agent was added gradually over a period of about 2 hours to 76 kg of stirred PTT oligomer ("heel") that had been prepared essentially in the same manner as described herein. The temperature of the oligomer heel was 281° C. (hot oil 297° C.) at the beginning of the paste addition, 266° C. after 30 minutes, and 245° C. at the end of the paste feed (oil 267° C.). The reaction pressure was essentially atmospheric. After an additional reaction time of about 30 minutes of esterification, after which the temperature was 254° C., 133.9 g phosphoric acid (25 ppm based on TPA) was added to react with the cobalt agent and then 32.3 g neat titanium tetrabutoxide catalyst (25 ppm) was added.

After this esterification step, a prepolymerization step was conducted in which the pressure of the reactor was lowered from about atmospheric to about 40 mbar and the reaction temperature was about 256° C. (oil 260° C.) over about 30 minutes.

Samples of the esterification product and prepolymerization product from a batch in this series showed about 0.2 mole % allyl groups.

After the prepolymerization step, the oligomer was transferred to a disk-ring, high surface area, reactor for polycondensation. The pressure in this reactor was ramped down from about 300 mbar to a final pressure of about 1 mbar over about 1 hour and then reduced further to about 0.5 mbar. The initial reaction temperature was about 266° C. and the final temperature was about 264° C. (oil temperature 255° C.). After about 3 hours from the beginning of the vacuum reduction, the polymer had reached the desired molecular weight and was discharged and pelletized to yield about 225 kg product. Product i.v. was 0.93. Allyl endgroup content was 0.4 mole %.

Example 12
Melt Polymerization

The polymerization of Example 11 was repeated except that a titanium silicate catalyst (titanium dioxide/silicon dioxide co-precipitate containing 80 mole % $TiO_2$ was incorporated into the PDO/TPA paste feed—50 ppm Ti, based on TPA—as the esterification catalyst) was used for the esterification (50 ppm Ti) and for polycondensation (80 ppm Ti). The reaction time for polycondensation was about 3.5 hours. The product i.v. was 0.97 at the beginning of discharge and 0.93 at the end of discharge.

Example 13
Melt Polymerization

The polymerization of Example 11 was repeated using neat (thus, dilute liquid catalyst is not absolutely required) titanium butoxide catalyst for esterification (50 ppm Ti) and after esterification (80 ppm Ti). The hot oil temperature at the start of esterification and addition of the TPA/PDO paste feed was reduced to about 270° C. compared to the higher initial hot oil temperature used in Example 11, and the final temperature of the esterification product was about 246° C.; product temperatures for the prepolymerization and polycondensation steps were about 247 and 255–263° C., respectively. The polycondensation step was about 4 hours and the product i.v. was about 1.10.

Similar polymerizations gave polymers of i.v. about 1.02, 1.05 and 1.05. Typical allyl endgroups in the polymer were 0.3 moles. Compared to Example 11, the lower melt temperature used in this example produced polymer with higher molecular weight (i.v.).

Example 14
Melt Polymerization

Polymerization was conducted as in Example 13, except for: a PDO/TPA mole paste feed ratio of about 1.3, 35 ppm Ti (titanium butoxide) catalyst (as a solution in PDO with terephthalic acid; catalyst preparation A) for esterification at about 2 bar pressure absolute and 65 ppm Ti catalyst for polycondensation, 10 ppm Co, about 260° C. at the start of the feed for esterification and final temperature of about 246° C., 243–245° C. during prepolymerization and about 248–268° C. during polycondensation. The final product i.v. was about 1.07. Filterability tests on the final product showed pressure rise of about 108 bar-cm2/kg and filterability on prepolymer product prepared in the subsequent batch prepared in essentially the same manner was 148 bar-cm2/kg, both of which indicate some formation of particles larger than about 20 microns.

Example 15
Melt Polymerization

Polymerization was conducted as in Example 14 using 15 ppm Ti catalyst (catalyst preparation A) and higher reaction temperatures during esterification, starting at 265° C., keeping the reaction at or above about 253° C. and ending at about 260° C., about 255–259° C. for prepolymerization and about 251–267° C. for polycondensation to form a product with i.v. of about 1.07. Filterability of the prepolymerization and final products were about 6 and 45 bar-cm2/kg, respectively, indicating reduced formation of particles.

Subsequent batches conducted essentially as in Example 14 showed prepolymer and final product filterabilities as low as about 2 and 8 bar-cm2/kg, respectively. Using titanium butoxide catalyst formulation in PDO/isophthalic acid (catalyst preparation B) or in PDO/acetic acid (catalyst preparation C) also gave good (low) filterability values, often below about 10 bar-cm2/kg. Typical allyl endgroup contents were 0.2–0.4 mole percent, and dipropylene glycol units ranged from about 1.1 to about 1.7 mole percent (0.6–0.9 weight percent).

Example 16

Examples 16–18 were prepared essentially as follows: in the course of several batch polymerizations, a paste consisting of about 99 kg PDO, 180 kg TPA (molar paste feed ratio about 1.3), toner (in Example 17—15.2 gm cobalt acetate; 20 ppm Co based on TPA; as 2% solution in PDO), 0.09 gm antifoam agent (0.5 ppm based on polymer), and 19.8 gm titanium butoxide catalyst (15 ppm Ti based on TPA; added as 2% solution in PDO/TPA or 7.3% solution in PDO/acetic acid) was added gradually over a period of about 2 hours to about 76 kg of stirred PTT oligomer ("heel") that had been prepared essentially in the same manner as described herein. The temperature of the oligomer heel was about 265° C. at the beginning of the paste addition and about 253° C. at the end of the paste feed. The reaction pressure was about 2 bar (absolute) and about 50 minutes after the end of the paste feeding, the pressure was reduced step-wise to about 1.8 bar over about 5 minutes, then to about 1.4 bar over about 5 minutes, and then to about atmospheric pressure (1.0 bar) over about 5 minutes. After an additional esterification time of about 1.3 to 1.5 hours after the end of the paste feeding, after which the temperature was about 258 to 260° C., 85.7 gm titanium butoxide catalyst (65 ppm Ti; as solution in PDO/TPA or PDO/acetic acid) was added.

After this esterification step, a prepolymerization step was conducted in which the pressure of the reactor was lowered from about atmospheric to about 50 to 65 mbar and the reaction temperature was about 255 to 257° C. over about 30 minutes.

After the prepolymerization step, the oligomer was transferred to a disk-ring, high surface area reactor for polycondensation. The pressure in this reactor was ramped down from about 300 mbar to a final pressure of less than 1 mbar over about 45 to 60 minutes. The reaction temperature was about 251 to 263° C. After about 3 hours, the polymer had reached the desired molecular weight and was discharged and pelletized to yield about 210 to 230 kg product.

For Examples 16 and 18, the Co toner was replaced by blue (1 ppm based on polymer) and red (0.3 ppm) toners (Estafil), respectively. For Examples 17 and 18, 14.4 gm of hindered phenol stabilizer, methyl 3-(3,5-di-t-butyl-4-hydroxyphenyl)propionate (as 10% suspension in PDO; about 64 ppm based on final polymer or about 0.22 mmol/Kg), was added to the paste feed.

Endgroup analyses showed about 10 to 11 mequiv/Kg carboxyl (COOH) endgroups for Examples 16–18. Allyl endgroups were about 0.3 mole.

Example 19

In Example 19, PTT was prepared similar to Examples 16–18 using a paste feed of about 99 kg PDO, 180 kg TPA, 144 gm of 10% suspension of the hindered phenol stabilizer used in Example 17 (14.4 gm; about 64 ppm based on final polymer), 64.6 gm titanium butoxide catalyst (50 ppm based on TPA), and 20 ppm Co (based on TPA) as cobalt acetate toner added over about 2 hours to the stirred PTT oligomer heel. The temperature of the heel was about 281° C. at the beginning of the paste addition, 266° C. after 30 minutes, and 245° C. at the end of the paste feed. The reaction pressure was essentially atmospheric pressure. After an additional esterification time of about 30 minutes, after which the temperature was 254° C., 133.9 gm phosphoric acid (25 ppm based on TPA) was added to react with the cobalt toner and then 32.3 gm titanium butoxide catalyst (25 ppm Ti based on TPA) was added.

In the prepolymerization step, the pressure was lowered from about atmospheric to about 40 mbar and the reaction temperature was about 256° C. over about 30 minutes. The polycondensation was conducted at about 255 to 266° C. to produce the desired molecular weight and the product was discharged and pelletized to yield about 225 kg.

Polymer Characteristics

The following study was undertaken to prepare PTT using DMT according to literature conditions having very low DPG content. We then compared the dyeability of these compositions to the all-melt PTT composition and to the PTT composition made by conventional technology with solid state polymerization. We also compared the acrolein formation in aging experiments.

The results show that the all-melt PTT composition with about 0.6 up to about 2 mole % DPG units is an optimum composition range with better dyeing than the DMT-based products and, surprisingly, equal to or better than the conventionally made TPA PTT product having higher DPG. The results also show that acrolein formation from the all-melt composition is less than from the conventionally made TPA PTT composition with higher DPG content, but the DMT-based products with very low DPG content show even less acrolein.

Therefore, the structure of the all-melt PTT is an overall or global optimum composition, having less acrolein formation than the higher DPG compositions but still retaining very good dyeability, which is compromised by the very low DPG compositions made from DMT.

DPG content in the polymer was measured by proton NMR (nuclear magnetic resonance) on polymer dissolved in a 50/50 by volume mixture of deuterated trifluoroacetic acid and chloroform; the methylene next to the ether oxygen of the DPG units has a charateric triplet resonance at 3.9 ppm. The absolute mole percent of DPG units in the polymer was determined using the integrated value of the 3.9 ppm resonance compared to the integrated NMR signals for the PDO and allyl units. The estimated precision was +/−0.04 mole % (absolute). I.V. was measured in a solution of 0.4 g polymer in 100 ml of a 60:40 solution of phenol:tetrachloroethane at 30° C. (or as a dilute solution in another solvent such as hexafluoroisopropanol, and converted by known correlation to the corresponding IV in 60:40 phenol:tetrachloroethane).

The following table summarizes the Examples and Comparative Examples in this study:

TABLE 1

| Example | Lot # | Stabilizer | IV (R-100) | DPG, mol % (NMR) | |
|---|---|---|---|---|---|
| 16 | P1242-5 | no | 0.89 | 1.64 | |
| 17 | P1214-14 | yes | 0.90 | 1.70 | |
| 18 | P1214-39/40 | yes | 0.92 | 1.30 | See discussion |
| A | 10ZPB002 | yes | 0.92 | 2.4 | SSP product |
| B | 4-3B1-44-1 | no | 0.92 | 3.0 | SSP product |
| T-1 | P1240-10 | no | 0.92 | 0.51 | |
| T-2 | P1240-11 | yes | 0.91 | 0.48 | |
| T-3 | P1240-14 | no | 1.08 | 0.55 | High IV |
| H-1 | P1240-15 | no | 0.91 | 0.50 | |
| H-2 | P1240-16 | yes | 0.91 | 0.21 | |
| H-3 | P1240-12 | no | 0.91 | 0.22 | 50 ppm Ti |
| H-4 | P1240-13A | yes | 0.91 | 0.35 | 50 ppm Ti |
| H-5 | P1240-13 | yes | 0.92 | 0.11 | 50 ppm Ti; lower temp |

Example 18 is included in the data here for completeness but considerable evidence suggests that this was an abnormal sample, particularly with regard to spinning and dyeing. This sample had been in storage for over a year. Tenacity data for this polymer suggests that it spun abnormally. Unlike the other examples, spinning of this material was difficult and only about 3 minute (or less) bobbins could be made because of breaks in the fibers. An extrusion film test of this material showed over 15,000 defects compared to generally <7,000 defects for normal polymer samples, indicating contamination of unknown origin. We believe that the dyeing data for Example 18 is suspect.

Comparative Example A is the composition containing higher DPG content prepared in a small commercial-scale plant under conditions similar to Example C. It contained 0.025% Irganox 1076 (octadecyl 3-(3,5-di-t-butyl-4-hydroxyphenyl)propionate) which is equivalent to about 138 ppm of the stabilizer used in Example 17 (or about 0.47 millimole/Kg). Note the higher level of stabilizer compared to the other Examples. Allyl groups were about 0.3 mole %.

Comparative Example B is a solid stated sample made in a benchscale reactor without any hindered phenol stabilizer. This sample was used in the aging studies only and was not spun or dyed.

Comparative Example C is a typical preparation of high DPG PTT. An oil-heated stainless steel reactor was charged with about 11.5 lbs. of 1,3-propanediol and about 19.3 lbs. of terephthalic acid and heated to about 250 to 260° C. at an oil jacket temperature set point of about 265° C. under 10 to 60 psig nitrogen. The aqueous distillate was removed as the reaction continued over about 4 hours. To the resulting oligomeric product was added about 9.6 lbs. PDO and about 16.1 lbs. TPA, and the reaction was continued under similar conditions for less than about 3 hours to form an oligomer with an average degree of polymerization of about 4 to 8.

Approximately half of the oligomer was transferred to a second reactor. For subsequent batches, PDO (9.6 lbs.) and terephthalic acid (16.1 lbs.) were added rapidly to the oligomer remaining in the first reactor and the oligomerization under pressure was repeated. Titanium butoxide (Ti(OBu)$_4$) was added as a solution in PDO/HOAc to the second reactor, the reaction mixture was heated at about 231 to 235° C. at an oil jacket temperature set point of about 250° C., the pressure was reduced to less than 2 mm Hg, and the excess PDO was distilled off over about 1 to 2 hours at full vacuum and about 240 to 250° C. (oil about 260° C.) until the desired molecular weight was achieved (i.v.=0.65 to 0.70). The molten polymer (about 20 lbs. product) was discharged from the reactor as strands, cooled, and pelletized. The polymers were advanced to higher molecular weight (i.v.=0.90 to 0.94) by solid state polymerization by heating at about 210 to 220° C. under vacuum for about 4 to 5 hours or more. The final polymer in this example contained about 3.7 mole % DPG (by proton NMR).

Examples T-1, T-2 and T-3 were made in the same reactor as Examples 16 and 17 using dimethyl terephthalate (DMT) using conditions as close as practical to those described in Japanese patent application 51-142097, filed Dec. 7, 1976, using about 2.2 molar feed ratio of PDO/DMT, and 100 ppm Ti catalyst (720 ppm titanium tetrabutoxide added as solution in PDO/acetic acid). The blue/red toners were also used, as in Example 16. Thus, for Examples T-1 and T-2, the first reactor was charged with about 164 liters of 1,3-propanediol and the catalyst and heated to about 160° C. Melted dimethyl terephthalate (DMT; about 200 Kg) was added to the stirred mixture over about 90 minutes while heating the mixture to about 177° C. The esterification reaction was continued for about 2 more hours while the temperature was increased to about 217 to 222° C. and methanol was distilled overhead. Vacuum was applied to reduce the pressure to about 60 to 70 mbar over about 1 hour and the reaction temperature at the end of this period was about 242 to 249° C. The reactor contents were transferred to the high surface area reactor and heated at about 244 to 255° C. melt temperature (oil set point 245° C.) under vacuum (<1 mbar at the end of the polycondensation) for about 4 to 4.5 hours to provide polymer with the desired IV of about 0.92 for spinning. The polycondensation time for T-3 was about 5.5 hours and because the IV was so high, this sample was not spun. The hindered phenol stabilizer (17 gm; about 80 ppm based on final polymer) was added to T-2 and T-3 as in Example 2.

Examples H-1 and H-2 were made in the same reactor using PDO/DMT feed ratio of about 1.4 under conditions as close as practical to those described in U.S. Pat. No. 5,340, 909 using 14 ppm Ti catalyst (100 ppm titanium tetrabutoxide added as a solution in PDO/acetic acid) for the esterification step, and 450 ppm butylstannoic acid (Fascat 4100) for the polycondensation step. The catalyst amounts are based on DMT. Blue/red toners were used for all the "H" examples. Example H-2 used hindered phenol stabilizer as in Example T-2. Thus, the first reactor was charged with about 105 liters of 1,3-propanediol and the Ti catalyst and heated to about 180 to 184° C. Molten DMT (about 200 Kg) was added to the stirred reactor over about 90 minutes and the esterification reaction was continued for an additional time of about 2.5 to 3 hours while increasing the temperature to about 225° C. and distilling methanol overhead. The pressure was reduced to about 50 to 60 mbar over about 1 hour at a reaction temperature starting about 228 to 237° C. and raised to about 250 to 253° C. The tin catalyst was added to the oligomeric product and the reactor contents transferred to the high surface area reactor. Polycondensation was conducted at about 241 to 253° C. (final pressure of <1 mbar) for a total of about 3 hours to reach the desired IV of about 0.92 for spinning. The polycondensation times were determined by the time needed to achieve 0.92 IV product rather than the times given in the patent.

Examples H-3 and H-4 were run under modified conditions similar to H-1 and H-2 but using 50 ppm Ti catalyst instead of 14 ppm in the esterification step. The reaction temperatures and times were about 182 to 236° C. over 3.3 to 4.5 hours (including DMT feed) for the esterification, about 237 to 244° C. and about 30 minutes for the vacuum pulldown, and about 236 to 250° C. (oil set point 245° C.) and about 2.7 to 3 hours for polycondensation to reach about 0.92 IV. Example H-5 was conducted similar to H-3 and H-4 but using a lower temperature in the esterification step (181 to 187° C. for about 2.3 hours. The temperature was then raised to about 220° C. during the vacuum pulldown and polycondensation was conducted at about 245 to 250° C. for about 2.3 hours.

Spinning The dried polymer chips were extruded and spun to make 80 and 150 denier partially oriented yarns (POY) using a 50-hole, 0.25/0.50 mm spinnerette and 245 to 255° C. extruder zone temperatures, 1500 to 1700 psi outlet pressure, 2.4 cc/rev melt pump at about 12 rpm and 23 rpm (for 80 and 150 denier, respectively), top and bottom godets at 4570 to 4580 m/min, type SW4 winder at 4500 m/min, interlacer at 4 bar and 60 psi, quench temperature 15° C., and Lurol PT 7087 spin finish. Generally, 10 and 30 minute bobbins were prepared at each denier.

Samples of the POYs were drawn using 9 wraps at 280 m/min on the first godet heated at 50° C., 14 wraps at 400 m/min on the second godet heated at 100° C., and a 400 m/min winder.

Dyeing procedure

The dyes were C.I. Disperse Blue 56 and 79. Disperse Blue 56 is a low energy dye with a small anthraquinone structure and a molecular weight of 305 g/mole. Disperse Blue 79 is a high energy monoazo dye with larger molecular size than Disperse Blue 56 and a molecular weight of 639 g/mole. The POY samples were dyed in one set of experiments and the drawn yarns were dyed separately in another set of experiments.

Yarns from each example were single knit to form fabrics using a Lawson-Hemphill Model FAK sample knitting machine. All fabrics (POY or drawn) from different examples with the same denier were dyed together. The competitive dyeing was performed with 0.5% owf (on weight of fabric) of either Disperse Blue 56 or Blue 79 at 20:1 liquor ratio using an AATCC Standard Atlas Launder-Ometer. Dyebath temperature was raised at 2° C./min from ambient to 100° C. and held for 45 minutes. The dyed fabrics were water rinsed and air dried.

After dyeing, the dye uptake was evaluated and compared by their K/S values at the wavelength with maximum absorbance, which is broadly used as a description of shade depth and is directly proportional to dye concentration on the fiber if the shade depth is not too high. Color differences between the yarns were measured by their CIELab values. To describe the differences of K/S and CIELab values among the yarns, %K/S and Delta E values were calculated using the yarn with the highest shade depth, i.e., Example 16 for both deniers, as the standard. Color measurement used a BYK Gardner Model TCS spectrophotometer. Generally, a Delta E larger than 0.5 or a %K/S difference larger than 5% indicated a visual color difference.

Comparing the K/S values between yarns with different denier, 150 denier was dyed darker than 80 denier, probably due to the larger diameter of the fiber and yarn of the 150 denier materials.

Delta E ($\Delta E$) is the overall color difference (see T. L Vigo, "Textile Processing and Properties," Elsevier, 1994, p. 330–331) between Example 16 and the compared sample and is calculated as $[(L*s-L*r)^2+(a*s-a*r)^2+(b*s-b*r)^2]^{1/2}$, where $L*$, $a*$ and $b*$ are the measured Cielab color values and s and r are the sample and the reference (Example 1), respectively. The larger the value of $\Delta E$, the larger the difference in color compared to the reference sample, viz. higher $\Delta E$ values indicate less dye uptake than Example 16.

K/S or "shade depth" is a measure of the opacity and reflectance (see Vigo) and is defined as $(1-R)^2/2R$, where R is the reflectance and S is the scattering coefficient. For Blue 56, the reflectance measurement was made at 630 nm and for Blue 79 the measurement was made at 610 nm. %K/S is the relative magnitude compared to the reference sample (Example 16).

Dyeing Results for Drawn Yarns

TABLE 2

| | | | | 80 Denier With Blue 56 | | | | | |
|---|---|---|---|---|---|---|---|---|---|
| Example | Denier | L* | a* | b* | Delta E | K/S 630 nm | % K/S | Process | % DPG |
| 16 | 82 | 48.34 | −6.95 | −32.65 | 0.00 | 5.815 | 100% | TPA melt | 1.64 |
| 17 | 77 | 47.88 | −6.76 | −32.69 | 0.50 | 5.961 | 103% | TPA melt | 1.7 |
| A | 78 | 48 | −6.85 | −33.7 | 1.11 | 6.157 | 106% | TPA SSP | 2.4 |
| T-1 | 78 | 49.43 | −9.45 | −28.64 | 4.85 | 5.264 | 91% | DMT | 0.51 |
| T-2 | 82 | 48.93 | −9.72 | −28.63 | 4.92 | 5.511 | 95% | DMT | 0.48 |
| H-1 | 82 | 50.61 | −5.87 | −34.61 | 3.19 | 5.013 | 86% | DMT | 0.5 |
| H-2 | 80 | 50.8 | −5.59 | −34.87 | 3.58 | 4.934 | 85% | DMT | 0.21 |
| H-3 | 82 | 48.9 | −6.11 | −34.31 | 1.94 | 5.71 | 98% | DMT | 0.22 |
| H-4 | 82 | 52.05 | −7.04 | −32.7 | 3.71 | 4.457 | 77% | DMT | 0.35 |
| H-5 | 82 | 51.92 | −7.14 | −32.51 | 3.59 | 4.487 | 77% | DMT | 0.11 |

Table 2 shows the dyeing results for 80 denier drawn yarns with Blue 56 dye. Example 16 and 17 were the darkest ($\Delta E$ 0.0 and 0.5, respectively). Based on $\Delta E$, all the other fibers, including Example A, did not dye as well. Based on % K/S, Examples 16, 17 and A were similar and all the DMT-based polymers were lighter, although H-3 was almost as high as Ex. 16.

Table 3 shows similar results for Blue 79 dye.

Again, Example 16 is darkest overall (ΔE=0.0) compared to the others, including Example 17 and A. In terms of % K/S, Example 16 and 17 are the best, Example A is next best, and all the other samples are not as good.

polymer with higher DPG content. Thus, the Invention compositions with about 0.6 to about 1.9 mole % DPG, represent optimum compositions in terms of dyeability.

TABLE 3

80 Denier With Blue 79

| Example | Denier | L* | a* | b* | Delta E | K/S 610 nm | % K/S | Process | % DPG |
|---|---|---|---|---|---|---|---|---|---|
| 16 | 82 | 42.16 | −5.56 | −23.71 | 0.00 | 5.997 | 100 | TPA melt | 1.64 |
| 17 | 77 | 44.83 | −6.42 | −23.69 | 2.81 | 5.132 | 85.6 | TPA melt | 1.7 |
| A | 78 | 46.13 | −6.56 | −24.13 | 4.12 | 4.741 | 79.1 | TPA SSP | 2.4 |
| T-1 | 78 | 45.19 | −6.42 | −23.3 | 3.18 | 4.944 | 82.4 | DMT | 0.51 |
| T-2 | 82 | 47.26 | −6.58 | −23.1 | 5.24 | 4.261 | 71.1 | DMT | 0.48 |
| H-1 | 82 | 46.63 | −6.38 | −23.05 | 4.59 | 4.417 | 73.7 | DMT | 0.5 |
| H-2 | 80 | 47.1 | −6.41 | −22.89 | 5.08 | 4.256 | 71 | DMT | 0.21 |
| H-3 | 82 | 47.04 | −6.32 | −23.12 | 4.97 | 4.28 | 71.4 | DMT | 0.22 |
| H-4 | 82 | 47.78 | −6.53 | −23.17 | 5.73 | 4.112 | 68.6 | DMT | 0.35 |
| H-5 | 82 | 47.87 | −6.5 | −23.05 | 5.82 | 4.07 | 67.9 | DMT | 0.11 |

The results at 150 denier appear to be generally similar although somewhat less definitive results in that occasionally a DMT-based sample gives %K/S similar to or higher than Example 16. However, Example 16 is still the darkest based on ΔE. See Tables 4 and 5.

Results on POY Yarns

Tables 6 to 9 show the data for POY samples. Overall, the results are similar to the drawn samples. In every case, Example 16 has the lowest ΔE and generally the highest % K/S compared to the DMT-based polymers and compared to

TABLE 4

150 Denier With Blue 56

| Example | Denier | L* | a* | b* | Delta E | K/S 630 nm | % K/S | Process | % DPG |
|---|---|---|---|---|---|---|---|---|---|
| 16 | 152 | 42.6 | −5.49 | −33.54 | 0.00 | 8.889 | 100% | TPA melt | 1.64 |
| 17 | 140 | 42.58 | −5.61 | −33.61 | 0.14 | 8.96 | 100.8% | TPA melt | 1.7 |
| 3 | 150 | 42.96 | −6.05 | −32.79 | 1.00 | 8.614 | 96.9% | TPA melt | 1.3 |
| A | 152 | 43.58 | −5.4 | −34.52 | 1.39 | 8.491 | 95.5% | TPA SSP | 2.4 |
| T-1 | 152 | 41.72 | −8.01 | −29.75 | 4.64 | 9.31 | 104.7% | DMT | 0.51 |
| T-2 | 152 | 42.73 | −8.07 | −29.7 | 4.63 | 8.58 | 96.5% | DMT | 0.48 |
| H-1 | 151 | 43.84 | −3.74 | −35.88 | 3.17 | 8.117 | 91.3% | DMT | 0.5 |
| H-2 | 152 | 44.53 | −3.67 | −35.89 | 3.54 | 7.656 | 86.1% | DMT | 0.21 |
| H-3 | 153 | 43.48 | −4.41 | −34.82 | 1.89 | 8.268 | 93.0% | DMT | 0.22 |
| H-4 | 152 | 44.33 | −4.67 | −35.01 | 2.41 | 7.865 | 88.5% | DMT | 0.35 |
| H-5 | 152 | 44.3 | −4.69 | −34.6 | 2.16 | 7.764 | 87.3% | DMT | 0.11 |

TABLE 5

150 Denier With Blue 79

| Example | Denier | L* | a* | /b* | Delta E | K/S 610 nm | % K/S | | DPG |
|---|---|---|---|---|---|---|---|---|---|
| 16 | 152 | 40.97 | −5.54 | −24.54 | 0.00 | 6.751 | 100 | TPA melt | 1.64 |
| 17 | 140 | 41.2 | −5.52 | −24.84 | 0.38 | 6.686 | 99 | TPA melt | 1.7 |
| 3 | 150 | 42.89 | −5.8 | −24.7 | 1.94 | 5.93 | 87.8 | TPA melt | 1.3 |
| A | 152 | 43.38 | −5.74 | −25.43 | 2.58 | 5.812 | 86.1 | TPA SSP | 2.4 |
| T-1 | 152 | 40.17 | −5.37 | −24.93 | 0.91 | 7.214 | 106.9 | DMT | 0.51 |
| T-2 | 152 | 40.97 | −5.52 | −24.75 | 0.21 | 6.785 | 100.5 | DMT | 0.48 |
| H-1 | 151 | 43.26 | −5.76 | −24.34 | 2.31 | 5.697 | 84.4 | DMT | 0.5 |
| H-2 | 152 | 43.46 | −5.76 | −24.22 | 2.52 | 5.59 | 82.8 | DMT | 0.21 |
| H-3 | 153 | 42.35 | −5.63 | −23.92 | 1.52 | 5.996 | 88.8 | DMT | 0.22 |
| H-4 | 152 | 43.31 | −5.75 | −24.25 | 2.37 | 5.648 | 83.7 | DMT | 0.35 |
| H-5 | 152 | 43.89 | −5.76 | −24.15 | 2.95 | 5.406 | 80.1 | DMT | 0.11 |

Generally, the data shows that not only does the composition of the Invention (Examples 16 and 17) dye better than the DMT-based polymers with low DPG content, but also the Invention composition dyes better than the TPA-based the current SSP product. Note that data for Example 18 is included, although we believe this is not representative of the properties of the polymer of the invention for reasons previously stated.

TABLE 6

80 Denier POY With Blue 56

| Example | L* | a* | b* | Delta E | K/S 630 nm | % K/S | Process | % DPG |
|---|---|---|---|---|---|---|---|---|
| 16 | 42.04 | −5.03 | −34.33 | 0.00 | 9.486 | 100 | TPA melt | 1.64 |
| 18 | 44.04 | −3.44 | −37.13 | 3.79 | 8.373 | 88.3 | TPA melt | 1.3 |
| A | 43.55 | −5.83 | −33.79 | 1.79 | 8.511 | 89.7 | TPA SSP | 2.4 |
| T-1 | 44.04 | −3.4 | −37.01 | 3.72 | 8.339 | 87.9 | DMT | 0.51 |
| T-2 | 44.46 | −8.13 | −30.61 | 5.41 | 7.75 | 81.7 | DMT | 0.48 |
| H-1 | 45.3 | −4.69 | −35.75 | 3.57 | 7.56 | 79.7 | DMT | 0.5 |
| H-2 | 44.55 | −4.49 | −36.09 | 3.11 | 8.078 | 85.2 | DMT | 0.21 |
| H-3 | 42.99 | −5.46 | −35.17 | 1.34 | 9.293 | 98 | DMT | 0.22 |
| H-4 | 44.83 | −4.71 | −35.48 | 3.03 | 7.764 | 81.8 | DMT | 0.35 |
| H-5 | 44.34 | −8.25 | −30.51 | 5.50 | 7.861 | 82.9 | DMT | 0.11 |

TABLE 7

80 Denier POY With Blue 79

| Example | L* | a* | b* | Delta E | K/S 610 nm | % K/S | Process | % DPG |
|---|---|---|---|---|---|---|---|---|
| 16 | 41.24 | −6.17 | −24.11 | 0.00 | 6.759 | 100 | TPA melt | 1.64 |
| 18 | 42.78 | −5.73 | −23.95 | 1.61 | 5.876 | 87 | TPA melt | 1.3 |
| A | 43.16 | −6.39 | −24.79 | 2.05 | 6.015 | 89 | TPA SSP | 2.4 |
| T-1 | 43.92 | −5.71 | −23.09 | 2.90 | 5.286 | 78.2 | DMT | 0.51 |
| T-2 | 42.31 | −6.41 | −24.6 | 1.20 | 6.377 | 94.3 | DMT | 0.48 |
| H-1 | 44.02 | −5.57 | −23.36 | 2.94 | 5.259 | 77.8 | DMT | 0.5 |
| H-2 | 43.39 | −5.6 | −23.62 | 2.28 | 5.545 | 82 | DMT | 0.21 |
| H-3 | 42.84 | −6.42 | −25.14 | 1.92 | 6.242 | 92.4 | DMT | 0.22 |
| H-4 | 44 | −5.84 | −23.67 | 2.81 | 5.349 | 79.1 | DMT | 0.35 |
| H-5 | 42.57 | −6.41 | −24.5 | 1.41 | 6.233 | 92.2 | DMT | 0.11 |

TABLE 8

150 Denier POY With Blue 79

| Example | L* | a* | b* | Delta E | K/S 630 nm | % K/S | Process | % DPG |
|---|---|---|---|---|---|---|---|---|
| 16 | 38.75 | −3.64 | −35.11 | 0.00 | 12.085 | 100% | TPA melt | 1.64 |
| 18 | 40.88 | −4.88 | −34.22 | 2.62 | 10.224 | 84.6% | TPA melt | 1.3 |
| A | 40.86 | −3.76 | −36.62 | 2.60 | 10.798 | 89.4% | TPA SSP | 2.4 |
| T-1 | 41.33 | −7.29 | −31.25 | 5.91 | 9.822 | 81.3% | DMT | 0.51 |
| T-2 | 39.2 | −6.66 | −31.33 | 4.86 | 11.377 | 94.1% | DMT | 0.48 |
| H-1 | 40.15 | −1.38 | −38.56 | 4.36 | 11.237 | 93.0% | DMT | 0.5 |
| H-2 | 43.04 | −2.59 | −38.11 | 5.34 | 9.122 | 75.5% | DMT | 0.21 |
| H-3 | 41.31 | −3.08 | −36.73 | 3.08 | 10.152 | 84.0% | DMT | 0.22 |
| H-4 | 41.91 | −3.09 | −37.13 | 3.79 | 9.784 | 81.0% | DMT | 0.35 |
| H-5 | 43.11 | −3.39 | −37.27 | 4.87 | 9.043 | 74.8% | DMT | 0.11 |

TABLE 9

150 Denier POY With Blue 79

| Example | L* | a* | b* | Delta E | K/S 610 nm | % K/S | Process | % DPG |
|---|---|---|---|---|---|---|---|---|
| 16 | 38.9 | −5.49 | −24.82 | 0.00 | 8.039 | 100.0% | TPA melt | 1.64 |
| 18 | 39.98 | −5.67 | −25.11 | 1.13 | 7.486 | 93.1% | TPA melt | 1.3 |
| A | 42.93 | −5.95 | −26.44 | 4.37 | 6.289 | 78.2% | TPA SSP | 2.4 |
| T-1 | 41.21 | −5.78 | −24.66 | 2.33 | 6.76 | 84.1% | DMT | 0.51 |
| T-2 | 41.94 | −5.88 | −24.9 | 3.07 | 6.459 | 80.3% | DMT | 0.48 |
| H-1 | 41.61 | −5.36 | −24.59 | 2.72 | 6.436 | 80.1% | DMT | 0.5 |
| H-2 | 42.85 | −5.59 | −24.34 | 3.98 | 5.873 | 73.1% | DMT | 0.21 |
| H-3 | 42.4 | −5.5 | −24.24 | 3.55 | 6.037 | 75.1% | DMT | 0.22 |
| H-4 | 39.72 | −5.14 | −24.13 | 1.13 | 7.31 | 90.9% | DMT | 0.35 |
| H-5 | 42.93 | −5.47 | −24 | 4.11 | 5.775 | 71.8% | DMT | 0.11 |

Acrolein Generation—Aging Study

Aging experiments were conducted to determine the stability of the polymer. Four-gram polymer pellets were placed in a forced-air drying oven and the temperature was set at 170° C. (independently checked by pyrometer). The tests were done at 170° C. to accelerate the test. At normal temperatures, the acrolein formation would be much slower. Periodically, a sample was removed after the aging time specified in Table 13 and analyzed. The acrolein was measured by headspace gas chromatography on pellets after heating the sample under air at 200° C. for 40 minutes. Results are reported as ppm based on polymer weight.

Intrinsic viscosity was measured in hexafluoroisopropanol and converted by known correlation to the corresponding values for 60/40 phenol/tetrachloroethane solvent at 30° C. The DPG content was measured by proton NMR (nuclear magnetic resonance) on polymer dissolved in a 50/50 volume mixture of deuterated trifluoroacetic acid and chloroform. The methylene next to the ether oxygen shows a characteristic resonance at 3.9 ppm and is reported as mole % of total PDO plus DPG units and wt % of polymer.

Table 10 shows the results for the samples made without hindered phenol stabilizer. It is clear that the polymers with low DPG content produce less acrolein. The polymer with the highest DPG (Example B) shows the highest acrolein generation early in the aging. The DMT-based polymers with very low DPG show very low acrolein generation even after 27 days, again showing that the acrolein generation is related to DPG level. The polymers of the Invention (Example 16) with moderate DPG level show somewhat higher acrolein formation than the DMT-based polymers.

The compositions of this Invention should thus require less stabilizer to suppress acrolein formation compared to compositions with higher initial DPG content.

TABLE 10

Acrolein Formation (ppm) After Aging at 170° C. (no stabilizer)

| Days | 16 | B | T-1 | H-1 | H-3 |
|---|---|---|---|---|---|
| 1 | 170 | 188 | 17 | 7 | 6 |
| 3 | 192 | 205 | 16 | 27 | 16 |
| 8 | 159 | 150 | 24 | 28 | 19 |
| 12 | 157 | 148 | 25 | 30 | 21 |
| 17 | 113 | 92 | 20 | 28 | 15 |
| 21 | 94 | 65 | 22 | 27 | 16 |
| 27 | 89 | 58 | 20 | 25 | 12 |
| InitialDPG(%) | 1.6 | 3 | 0.51 | 0.5 | 0.22 |

Table 11 shows the change in DPG content as the polymers were aged at 170° C. The decrease in DPG, which is due to oxidation of DPG to acrolein, is highest for the polymers with the highest initial DPG content. Thus, the decrease in DPG for Example B is almost 1% (from 3 to 2%) compared to about 0.66% loss for Example 16.

TABLE 11

Change in DPG (mole %)

| Example | stabilizer | unaged | 1 day | 3 days | 8 days | 12 days | 17 days | 21 days | 27 days | Overall change |
|---|---|---|---|---|---|---|---|---|---|---|
| 16 | no | 1.64 | 1.61 | 1.56 | 1.27 | 1.06 | 0.97 | 0.94 | 0.98 | −0.66 |
| B | no | 3 | 3.2 | 2.92 | 2.52 | 2.14 | 2.48 | 2.28 | 2.03 | −0.97 |
| T-1 | no | 0.51 | 0.46 | 0.54 | 0.52 | 0.44 | 0.44 | 0.43 | 0.48 | −0.03 |
| H-1 | no | 0.5 | 0.42 | 0.52 | 0.5 | 0.43 | 0.41 | 0.42 | 0.39 | −0.11 |
| H-3 | no | 0.22 | 0.22 | 0.24 | 0.25 | 0.19 | 0.25 | 0.19 | 0.19 | −0.03 |

Table 12 shows the change in IV during the aging study. Note that the DMT-based examples show less IV change, even without stabilizer. In some cases, the change is near the potential error of the IV measurements, so the effect of stabilizer at these low DPG levels is very small, at best. Overall, the results are completely consistent with generation of acrolein by oxidation of DPG units, which results in chain cleavage and lower IV.

TABLE 12

IV Data on Aged Samples

| Example | Stabilizer | Initial IV | IV @ 27 days | Change* |
|---|---|---|---|---|
| 16 | No | 0.89 | 0.63 | 0.26 |
| 18 | Yes | 0.92 | 0.81 | 0.11 |
| A | Yes | 0.92 | 0.81 | 0.11 |
| B | No | 0.92 | 0.74 | 0.18 |
| T-1 | No | 0.92 | 0.87 | 0.05 |
| T-2 | Yes | 0.91 | 0.89 | 0.02 |
| H-1 | No | 0.91 | 0.84 | 0.07 |
| H-2 | Yes | 0.91 | 0.83 | 0.08 |
| H-3 | No | 0.91 | 0.87 | 0.04 |
| H-4 | Yes | 0.91 | 0.86 | 0.05 |
| H-5 | yes | 0.92 | 0.86 | 0.06 |

*Total error can be +/− 0.04 because error for each IV measurement is +/− 0.01.

TABLE 13

Acrolein Generation (ppm) after Aging at 170° C. (with hindered phenol stabilizer)

| Days | Example 17 | Example 19 |
|---|---|---|
| 1 | 13 | 9 |
| 3 | 13 | 8 |
| 8 | 72 | 13 |
| 12 | 242 | 22 |
| 17 | 171 | 28 |
| 21 | 126 | 38 |
| 27 | 102 | 12–30 |
| Initial DPG(%) | 1.7 | 0.6 |

We claim:

1. A process of producing polytrimethylene terephthalate (PTT) with an intrinsic viscosity of 0.75 up to at least 1.15 dl/g by esterification of terephthalic acid (TPA) with trimethylene glycol (TMG) in the presence of a catalytic titanium compound to obtain an esterification product, precondensation of the esterification product to obtain a precondensation product and polycondensation of the precondensation product to obtain PTT, characterized in that a) the esterification is performed in at least two stages, a first, initial stage and at least one second subsequent esterification step, b) a catalyst feed is provided wherein the catalyst is a compound of a metal which may be titanium or zirconium, c) a major quantity between 65 and 100 wt % of said catalyst feed containing 35 to 110 ppm metal is introduced into the at least one subsequent esterification stage, which is operated at a temperature of 240 to 275° C. and a pressure of 0.7 to 1.5 bar, d) a minor quantity of said catalyst feed containing 0 to 40 ppm metal and up to 35 wt % of the total catalyst is directly fed to the initial esterification stage which is operated at a temperature of 240 to 275° C., a total molar TMG to TPA feed ratio of 1.15 to 2.5, and a pressure of 1 to 3.5 bar, e) the precondensation is performed at a temperature of 250 to 270° C. under a reduced pressure between 2 and 200 mbar, and f) the polycondensation is carried out in the melt phase at a pressure of 0.2 to 2.5 mbar and a temperature of 250 to 270° C.

2. A process as claimed in claim 1, characterized in that said catalyst compound is a titanium alkylate.

3. A process as claimed in claim 2, characterized in that said titanium alkylate is selected from the group consisting of titanium tetrabutylate, titanium tetraisopropylate, tetra-(2-ethylhexyl)-titanate, titanium dioxide-silicon dioxide co-precipitates, hydrated sodium containing titanium dioxide, titanium salts of organic acids, and titanium complexes with hydroxycarboxylic acids.

4. A process is claimed in claim 1 characterized in that the catalyst is introduced as liquid catalyst feed and is prepared having a concentration of less than 5 wt % metal based on TMG in the form of a titanium or zirconium compound stabilized by an organic acid.

5. A process as claimed in claim 4, characterized in that said liquid catalyst feed contains trimethylene glycol in which a $C_4$ to $C_{12}$ dicarboxylic acid is dissolved below its saturation concentration.

6. A process as claimed in claim 5, characterized in that the dicarboxylic acid is terephthalic acid or isophthalic acid.

7. A process as claimed in claim 4, characterized in that said liquid catalyst feed contains trimethylene glycol in which a $C_2$ to $C_{12}$ monocarboxylic acid is dissolved below its saturation concentration.

8. A process as claimed in claim 7, characterized in that the monocarboxylic acid is acetic acid.

9. A process as claimed in claim 1, characterized in that in step f), the temperature generally increases from the entrance to the exit of the polycondensation reactor, the polymer is agitated, and the reaction product forms steadily renewed, large film surfaces for evaporation of the split products.

10. A process as claimed in claim 9, characterized in that for generating the vacuum to perform the precondensation and polycondensation, vapor-jet pumps are used to remove the released TMG and PTT oligomers and low boilers from the gas phase of the reactors, the vapor-jet pumps are operated with TMG vapor, the vapors sucked off and compressed by the vapor-jet pumps, and the TMG vapors are condensed by spraying them with a liquid which predominantly consists of TMG.

11. A process as claimed in claim 1, characterized in that the process is continuous and the reaction product is withdrawn at any point between the exit of the subsequent stage of esterification and the entry to the polycondensation and mixed with the TMG and TPA by recycling said reaction product to the first initial esterification stage.

12. A process as claimed in claim 11, characterized in that the amount of said reaction product which recycled to the initial esterification stage is in the range of 5 to 40 wt % of the nominal throughput.

13. A process as claimed in claim 1, characterized in that the process is a discontinuous process and the initial process cycle with a transiently heterogeneous reaction mixture and a limited TPA conversion of below 95 represents said initial stage and the later reaction cycle in a homogeneous melt phase with a TPA conversion of at least 97% represents said subsequent stage of the esterification process to which the major part of the catalyst is fed, and a portion of the reaction product is kept back at the end of the precondensation and used for the next discontinuous process in step d) as catalyst-containing reaction product.

14. A process as claimed in claim 13, characterized in that the amount of said catalyst containing reaction product recycled to the initial esterification stage is from 25 to 85 wt % of the nominal batch size.

15. A process as claimed in claim 1, characterized in that the first initial stage of esterification is conducted to a degree of esterification of 90 to 95 wt %, and the subsequent stage of esterification is conducted to a degree of esterification of 97 to 99 wt %.

16. A process as claimed in claim 10, characterized in that the condensed vapors are recirculated to the initial stage of the esterification, optionally to subsequent esterification stages and optionally after removal of the low boilers from TMG by distillation.

17. A process as claimed in claim 1, characterized in that the PTT contains up to 20 wt % comonomer units derived from other dicarboxylic acids and/or diols.

18. A process as claimed in claim 1, characterized in that said polycondensation reactor is a disc ring reactor or a cage type reactor.

19. A process as claimed in claim 1, characterized in that the temperatures of the walls of the reaction vessels are controlled by using a heat transfer medium (HMT) and that the HMT temperature be not more than 300° C.

\* \* \* \* \*